US012784733B2

(12) United States Patent
Shikhar et al.

(10) Patent No.: US 12,784,733 B2
(45) Date of Patent: Nov. 3, 2026

(54) LLMVOX: AUTOREGRESSIVE STREAMING TEXT-TO-SPEECH MODEL FOR ANY LARGE LANGUAGE MODEL (LLM)

(71) Applicant: Mohamed bin Zayed University of Artificial Intelligence, Abu Dhabi (AE)

(72) Inventors: Sambal Shikhar, Abu Dhabi (AE); Mohammed Irfan Kurpath, Abu Dhabi (AE); Sahal Shaji Mullappilly, Abu Dhabi (AE); Jean Lahoud, Abu Dhabi (AE); Fahad Khan, Abu Dhabi (AE); Rao Muhammad Anwer, Abu Dhabi (AE); Salman Khan, Abu Dhabi (AE); Hisham Cholakkal, Abu Dhabi (AE)

(73) Assignee: Mohamed bin Zayed University of Artificial Intelligence, Abu Dhabi (AE)

( * ) Notice: Subject to any disclaimer, the term of this patent is extended or adjusted under 35 U.S.C. 154(b) by 0 days.

(21) Appl. No.: 19/425,678

(22) Filed: Dec. 18, 2025

(65) Prior Publication Data

US 2026/0311684 A1 Oct. 8, 2026

Related U.S. Application Data

(60) Provisional application No. 63/777,319, filed on Mar. 25, 2025.

(51) Int. Cl.
*G10L 13/08* (2013.01)
*G10L 13/027* (2013.01)
(Continued)

(52) U.S. Cl.
CPC ............ *G10L 13/08* (2013.01); *G10L 13/027* (2013.01); *G06F 40/284* (2020.01); *G06F 40/289* (2020.01)

(58) Field of Classification Search
CPC .............................. G10L 13/08; G10L 13/027
See application file for complete search history.

(56) References Cited

U.S. PATENT DOCUMENTS

| | | | | |
|---|---|---|---|---|
| 12,548,551 B1 * | 2/2026 | Schnell | .................. | G10L 13/08 |
| 2020/0298873 A1 * | 9/2020 | Provost | .................. | G10L 15/22 |

(Continued)

FOREIGN PATENT DOCUMENTS

| | | |
|---|---|---|
| CN | 111312209 A | 6/2020 |
| CN | 118248120 A | 6/2024 |
| KR | 10-2745367 B1 | 12/2024 |

OTHER PUBLICATIONS

Wu, J., & Luan, J. (2020). Adversarially trained multi-singer sequence-to-sequence singing synthesizer. arXiv preprint arXiv:2006.10317.*

(Continued)

*Primary Examiner* — Bryan S Blankenagel
(74) *Attorney, Agent, or Firm* — Oblon, McClelland, Maier & Neustadt, L.L.P.

(57) ABSTRACT

A text-to-speech (TTS) method and system for generating streaming speech based on phoneme-level token processing using a decoder-only transformer includes receiving an input text from a large language model (LLM), tokenizing the input text into a sequence of phoneme-level tokens, mapping each phoneme-level token to a phoneme-embedding vector, concatenating each phoneme-embedding vector with a latent acoustic-feature vector derived from a previous speech token or initialized as a zero tensor, and adding a learnable positional-embedding vector to form a sequence of position-embedded feature vectors. The sequence is fed to the decoder-only transformer configured to autoregressively predict subsequent speech tokens in a streaming manner. The predicted speech tokens are converted into audio frames by a neural audio codec implementing residual vector quantization (RVQ), while adaptive text chunks are alternately processed through parallel queues to achieve real-time, low-latency multilingual speech synthesis suitable for multimodal LLM integration.

14 Claims, 11 Drawing Sheets

(51) Int. Cl.
*G06F 40/284* (2020.01)
*G06F 40/289* (2020.01)

(56) References Cited

U.S. PATENT DOCUMENTS

| | | | | |
|---|---|---|---|---|
| 2022/0230627 | A1* | 7/2022 | Chang | G10L 15/22 |
| 2022/0238095 | A1* | 7/2022 | Liu | G10L 13/08 |
| 2023/0317085 | A1* | 10/2023 | Yamamoto | G10L 17/14 704/249 |
| 2023/0343319 | A1 | 10/2023 | Hu et al. | |
| 2025/0029601 | A1* | 1/2025 | Rahman | G10L 17/08 |
| 2025/0061882 | A1* | 2/2025 | Kons | G10L 13/02 |
| 2025/0140247 | A1 | 5/2025 | Choi | |
| 2025/0273194 | A1* | 8/2025 | Venkataramani | G10L 13/0335 |

OTHER PUBLICATIONS

Joun Yeop Lee, et al., “High Fidelity Text-to-Speech Via Discrete Tokens Using Token Transducer and Group Masked Language Model”, Interspeech 2024, Sep. 1-5, 2024, pp. 3445-3449.

* cited by examiner

LLMVOX: AUTOREGRESSIVE STREAMING TEXT-TO-SPEECH MODEL FOR ANY LARGE LANGUAGE MODEL (LLM)

CROSS-REFERENCE TO RELATED APPLICATIONS

This present application claims the benefit of U.S. Provisional Application No. 63/777,319, "LLMVOX: AUTOREGRESSIVE STREAMING TEXT-TO-SPEECH MODEL FOR ANY LLM" filed on Mar. 25, 2025, which is incorporated herein by reference in its entirety.

PRIOR DISCLOSURE BY AN INVENTOR

Aspects of the present disclosure are described in S. Shikar et al., "LLMVoX: Autoregressive Streaming Text-to-Speech Model for Any LLM," (2025) arXiv:2503.04724 at doi.org/10.48550/arXiv.2503.04724, which is incorporated herein by reference in its entirety.

BACKGROUND

Technical Field

The present disclosure relates to generation of high-quality speech from text in real time, and, in particular, to a speech synthesis framework that operates independently of any underlying large language model (LLM).

Description of Related Art

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In recent years, large language models (LLMs) have emerged as the backbone of natural language understanding and generation systems. These models, trained on extensive corpora of textual data, have demonstrated exceptional reasoning, inference, and dialogue generation capabilities. While LLMs were initially developed to handle text-based interactions, recent developments in multimodal systems have prompted an evolution towards more natural, speech-enabled interfaces that allow users to engage with AI systems through spoken language. This evolution has given rise to speech-to-speech dialogue models that aim to provide seamless and expressive conversational experiences.

Existing speech-enabled LLM architectures generally fall into two categories: end-to-end integrated systems and cascaded systems. End-to-end systems attempt to unify text and speech processing within a single model by fine-tuning a pretrained LLM on multimodal datasets comprising paired speech and text data. Notable examples of such architectures include Kyotai Moshi, Mini-Omni, LLaMA-Omni, and Freeze-Omni. These systems modify the base LLM architecture to accommodate spoken inputs and outputs, thereby enabling direct processing of speech in real-time applications. Although this approach facilitates streamlined speech generation, it introduces several drawbacks.

First, end-to-end systems require extensive fine-tuning of the LLM on large-scale multimodal corpora, thereby significantly increasing training costs and computational overhead. Second, this multimodal fine-tuning often leads to degradation in the original reasoning, inference, and expressive abilities of the base LLM. Moreover, these systems typically condition speech adaptation on internal hidden states of the LLM, rendering the architecture LLM-dependent. As a result, any substitution or update of the base LLM necessitates retraining of the speech-specific components, thus undermining modularity, scalability, and reusability.

In an effort to mitigate these limitations, LLM-agnostic cascaded systems have been developed. In such systems, a user's spoken input is first transcribed into text using an automatic speech recognition (ASR) module. The text is then processed by an LLM to generate a textual response, which is subsequently converted into speech using a text-to-speech (TTS) engine. This architecture offers several advantages, including the use of off-the-shelf ASR, LLM, and TTS modules; the preservation of the LLM's pretrained capabilities; and the flexibility to operate with any LLM backend without retraining. Notably, cascaded architectures allow for plug-and-play compatibility across LLMs of varying sizes and architectures.

However, existing cascaded systems suffer from significant drawbacks that hinder their deployment in real-time conversational applications. A primary issue is the high latency introduced by the mismatch between the autoregressive nature of LLM-based text generation and the batch processing behavior of conventional TTS models. Since most TTS systems require the complete or a substantial portion of the generated text to begin synthesis, they cannot initiate speech generation incrementally. This dependency results in delayed audio output, particularly in dialogue scenarios where responsiveness is critical. Moreover, many cascaded systems rely on non-streaming TTS decoders, further compounding latency and leading to disjointed conversational flow.

US Patent Publication No. US20240115672A1 describes a multimodal language model that integrates speech synthesis with textual reasoning but conditions speech output on the internal representations of the base LLM. While this allows direct speech interaction, it remains tightly coupled with the LLM and requires significant fine-tuning. Similarly, systems such as SpeechGPT, AudioPaLM, and AnyGPT incorporate speech tokens into the LLM vocabulary to support end-to-end inference. However, these chain-of-modality models must wait for complete textual outputs before beginning speech generation, inherently restricting their real-time performance.

Other references such as GLM-4-Voice, MiniCPM-o, and Freeze-Omni offer streaming speech synthesis capabilities but still condition speech decoding on LLM-specific outputs or require multi-stage training pipelines, thereby limiting their portability across LLMs. Each of these systems suffers from one or more deficiencies, including high latency, compromised LLM reasoning, or lack of model modularity, making them unsuitable for real-time and scalable deployment across different domains and languages.

Accordingly, there remains a need for an improved system and method that enables real-time speech synthesis without modifying or retraining the underlying LLM, that maintains the linguistic fidelity and expressive capacity of the LLM, and that supports low-latency speech generation in a modular, streaming, and autoregressive manner.

SUMMARY

Aspects of the present disclosure relate to a text-to-speech (TTS) method and system for generating streaming speech based on phoneme-level token processing using a decoder-only transformer. The method begins by receiving an input text from a large language model (LLM) and tokenizing the input text into a sequence of phoneme-level tokens. Each phoneme-level token is mapped to a corresponding phoneme-embedding vector, which is concatenated with a latent acoustic-feature vector derived from a previously generated speech token or initialized as a zero tensor to form a combined-feature vector. A learnable positional-embedding vector is added to each combined-feature vector to form a sequence of position-embedded feature vectors, which is fed to a decoder-only transformer configured to autoregressively predict subsequent speech tokens in a streaming manner.

The method further enables real-time streaming by processing a plurality of adaptive text chunks that are alternately supplied through a plurality of parallel queues. Each adaptive text chunk is queued alternately in first and second first-in-first-out (FIFO) buffers, allowing the tokenizing, mapping, concatenating, and feeding operations to be performed concurrently on the contents of the FIFO buffers to achieve low-latency streaming generation of the speech tokens.

The adaptive text chunks may be assigned to the FIFO buffers based on detected sentence boundaries within the input text, and an adaptive chunk size is dynamically updated according to the detected sentence boundaries.

To improve performance and consistency, the method may pad each phoneme-embedding vector with a padding vector corresponding to a predetermined pad token that lacks phonetic information, L2-normalize each combined-feature vector before adding the learnable positional-embedding vector, and apply a causal-attention mask within the decoder-only transformer so that each speech token attends only to preceding speech tokens generated by the transformer. The latent acoustic-feature vector may be initialized as a zero tensor before generating a first speech token and updated using an acoustic feature derived from a most recent speech token for use in a subsequent concatenating step. The method may also output each predicted speech token as soon as it is generated while continuing to process a next adaptive text chunk, thereby maintaining continuous streaming output. The predicted speech tokens are decoded by a neural audio codec, which may employ a single-layer residual vector quantization (RVQ) scheme to produce high-fidelity speech signals.

In another aspect, a text-to-speech system is disclosed. The system includes at least one processor and a memory storing instructions that, when executed by the processor, cause the processor to perform the operations of the text-to-speech method described above. The system is configured to receive input text from a large language model, tokenize the text into phoneme-level tokens, map each token to a phoneme-embedding vector, concatenate each embedding vector with a latent acoustic-feature vector derived from a previously generated speech token or initialized as a zero tensor, add a learnable positional-embedding vector to form a sequence of position-embedded feature vectors, and feed the sequence to a decoder-only transformer configured to autoregressively predict subsequent speech tokens in a streaming manner. The system further includes a plurality of parallel queues comprising first and second FIFO buffers to support adaptive chunk processing, in which the tokenizing, mapping, concatenating, and feeding operations are performed concurrently on contents of the buffers for real-time streaming generation of speech tokens. The system may additionally apply causal-attention masking, perform normalization, manage adaptive chunk scheduling, and implement the neural audio codec with residual vector quantization (RVQ) to provide low-latency, high-quality, multilingual streaming speech synthesis suitable for integration with multimodal LLM pipelines.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION

Figure 1:
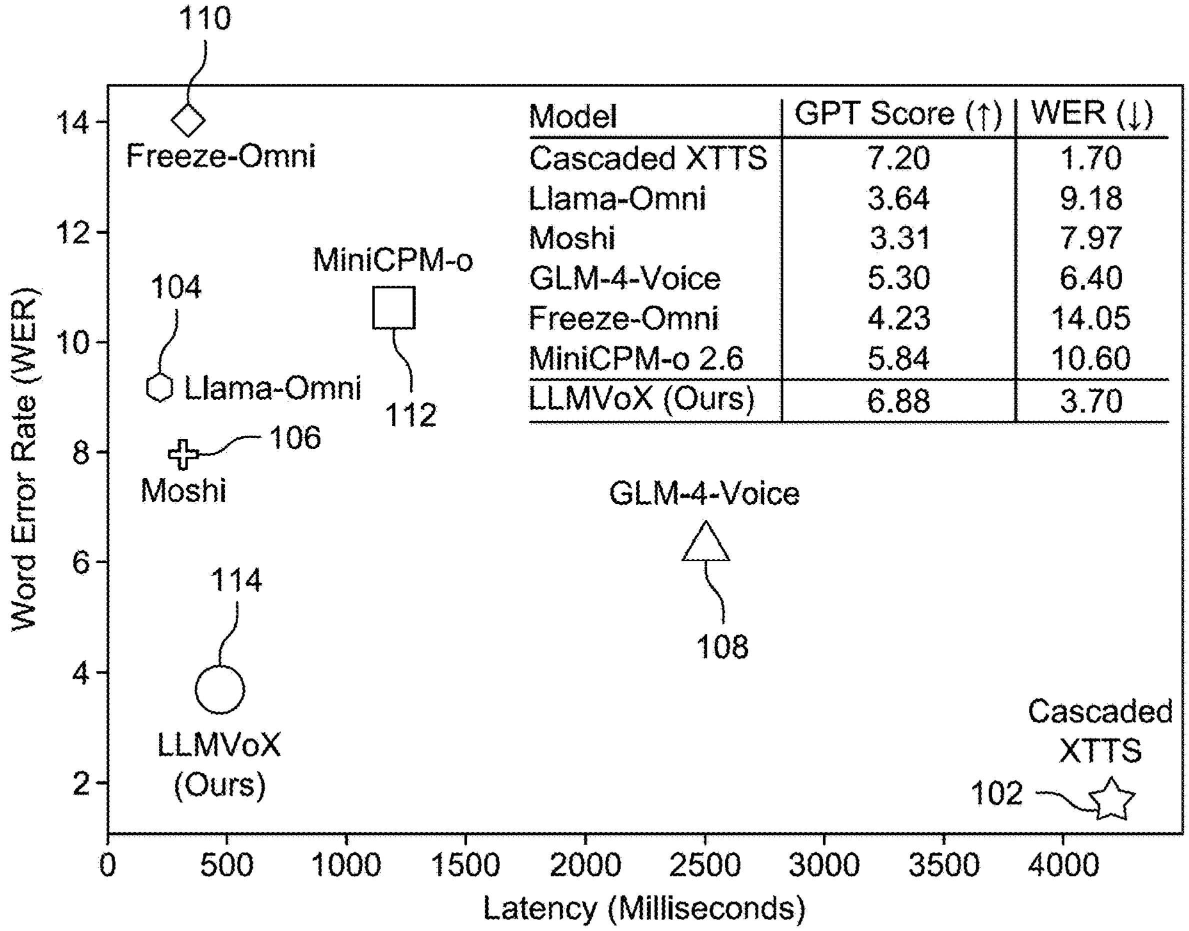
FIG. 1 is a graphical representation illustrating the comparative performance of speech-enabled large language model systems according to some embodiments of the present disclosure.

In the drawings, like reference numerals designate identical or corresponding parts throughout the several views. Further, as used herein, the words “a”, “an” and the like generally carry a meaning of “one or more”, unless stated otherwise.

Furthermore, the terms “approximately,” “approximate”, “about” and similar terms generally refer to ranges that include the identified value within a margin of 20%, 10%, or preferably 5%, and any values therebetween.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "top," "bottom," "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The order of discussion of the different steps as described herein has been presented for clarity sake. In general, these steps can be performed in any suitable order. Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

FIG. 1 is a graphical representation illustrating the comparative performance of speech-enabled large language model systems in terms of word error rate (WER) and latency, according to certain embodiments. The comparison reflects systems consistent with a decoder-only transformer configured to autoregressively predict speech tokens in a streaming manner. The vertical axis denotes the WER, while the horizontal axis denotes the latency measured in milliseconds. The graph includes multiple systems evaluated under consistent experimental settings and configured with similarly sized base large language models, thereby enabling a fair comparison of speech quality and response time.

Each data point in the figure is represented by a distinct shape indicating model category. A triangular marker denotes an LLM-dependent model, whereas a star-shaped marker denotes an LLM-agnostic model. The area of each marker is proportional to the GPT score attained by the corresponding model, signifying the overall naturalness and appropriateness of the generated responses.

Marker 114 positioned at approximately 500 milliseconds latency and a WER of 3.70 corresponds to the LLMVoX system, which is configured as an LLM-agnostic, autoregressive streaming text-to-speech (TTS) framework that processes adaptive text chunks alternately supplied through parallel queues (first and second FIFO buffers), employs a decoder-only transformer to autoregressively predict subsequent speech tokens, and uses a neural audio codec (e.g., implementing RVQ) to convert the predicted speech tokens into audio frames. The LLMVoX system operates independently of the underlying LLM, generates high-fidelity speech with low latency, and requires no fine-tuning or architectural modification of the base LLM. It implements a parallel-queue (dual-FIFO) streaming mechanism that permits continuous and infinite-length speech generation while maintaining acoustic continuity and minimizing delay. LLMVoX further supports integration with off-the-shelf automatic speech recognition (ASR) systems and vision-language models (VLMs), thus facilitating flexible multimodal deployment.

Marker 102 represents the Cascaded XTTS system, which is an LLM-agnostic cascaded pipeline comprising separate ASR, LLM, and TTS components. While Cascaded XTTS achieves the lowest WER of 1.70, the system 102 incurs a latency exceeding 4000 milliseconds due to the sequential execution of components and the non-streaming nature of conventional TTS models, making it unsuitable for real-time interaction.

Marker 104 represents the LLaMA-Omni model 104. This system integrates speech into the LLM by modifying the base text model and employing a connectionist temporal classification (CTC)-based mechanism for speech processing. Despite achieving relatively low latency, the WER remains comparatively high.

Marker 106 represents the Moshi model 106. Moshi uses a dual-channel architecture and neural audio coding for real-time dialogue generation, and relies on multimodal training to incorporate speech features into the LLM.

Marker 108 represents the GLM-4-Voice model 108. GLM-4-Voice utilizes a low-bitrate tokenizer and extensive bilingual corpora to achieve high-fidelity synthesis, but its compute requirements and latency are significantly higher relative to more efficient systems.

Marker 110 corresponds to the Freeze-Omni system 110. Freeze-Omni maintains the original base LLM weights while introducing speech-specific modules trained in a multi-stage process. However, the system 110 relies on LLM hidden states for conditioning the speech decoder, resulting in a system that is inherently LLM-dependent and necessitates retraining for different LLM backbones.

Marker 112 represents MiniCPM-o 2.6 model 112. MiniCPM-o 2.6 is a streaming speech decoder integrated with an omni-modal LLM to support real-time synthesis. However, the model remains LLM-dependent, and its performance in terms of latency and WER does not match that of LLMVoX.

As illustrated in FIG. 1, the LLMVoX system achieves a favorable trade-off between latency and speech quality, delivering a WER of 3.70 and a GPT score of 6.88 at an end-to-end latency of approximately 475 milliseconds, consistent with a decoder-only transformer architecture operating in a streaming manner with adaptive text chunks and parallel queues. The method demonstrates a balanced and efficient solution for speech-enabled AI, suitable for real-time applications and multimodal extensions across languages and domains, without the constraints of LLM dependency or multimodal retraining.

Figure 2A:
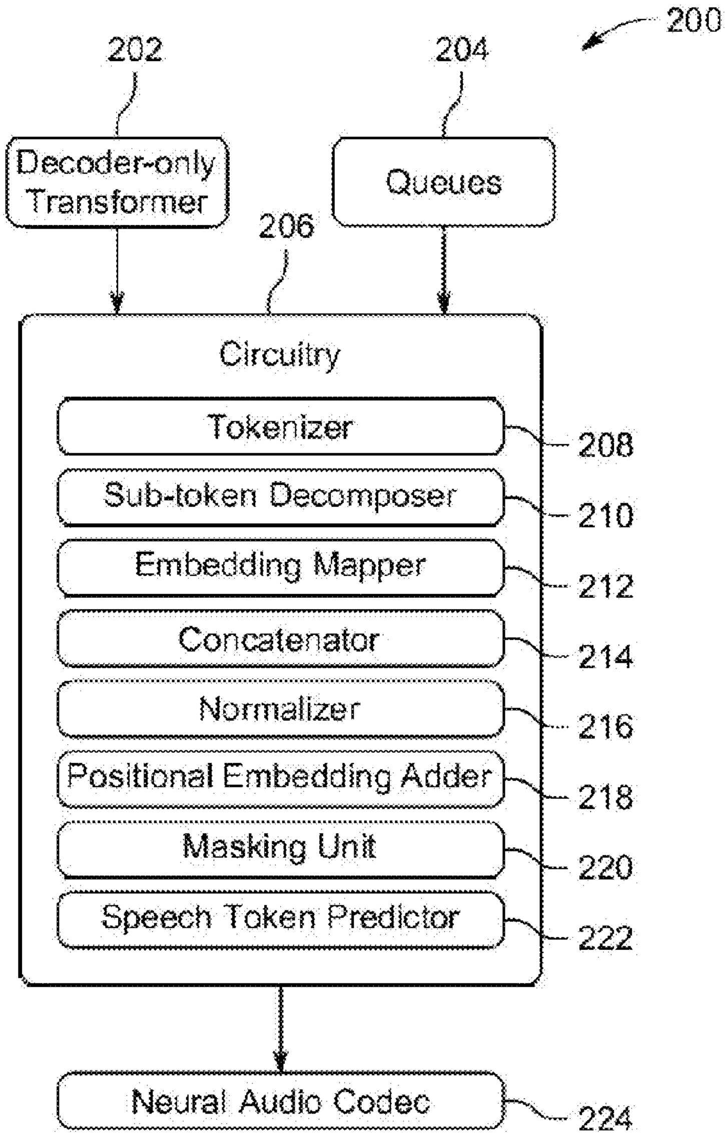
FIG. 2A is a schematic diagram of a text-to-speech system according to some embodiments of the present disclosure.

FIG. 2A illustrates a text-to-speech system. The text-to-speech system 200, alternatively referred to as a system 200, includes a decoder-only transformer 202, parallel queues 204 comprising first and second first-in-first-out (FIFO) buffers, and circuitry 206 configured to receive an input text from a large language model (LLM) and to execute a series of operations to convert the input text into an audio speech signal. Each system component shown in FIG. 2A supports the functions described below with defined inter-component interactions, implementation options, configuration variations and processing steps.

The decoder-only transformer 202 is configured as an autoregressive transformer model that applies a causal-attention mask to predict subsequent speech tokens based on position-embedded feature vectors and preceding speech tokens. The decoder-only transformer 202 comprises multiple stacked transformer layers, each including a multi-head attention mechanism, feedforward networks, layer normalization units, and residual connections. The decoder-only transformer 202 is structured to receive a sequence of position-embedded feature vectors representing fused phoneme-level and acoustic features and generate the next discrete speech token in an autoregressive fashion. A causal-attention mask is applied so that each speech token attends only to preceding speech tokens, preventing future-context leakage.

A queue in the system 200 is implemented to manage a sequential flow of adaptive text chunks between asynchronous modules in a real-time streaming TTS pipeline. The parallel 204 include a first FIFO queue and a second FIFO queue for alternately queuing a plurality of adaptive text chunks. These queues 204 are configured to manage adaptive text-chunk input based on detected sentence boundaries, wherein the first FIFO queue receives adaptive text chunks from a first sentence group and the second FIFO queue receives adaptive text chunks from a second sentence group. This arrangement enables parallel processing on independent sentence groups. Each of the queues 204 may be implemented in hardware as dual-ported memory or in software using dynamic memory buffers and enqueues/dequeues managed by system firmware.

The circuitry 206 comprises a hybrid configuration including one or more general-purpose processors, digital signal processors (DSPs), graphics processing units (GPUs), or application-specific integrated circuits (ASICs), coupled with non-transitory memory storing logic instructions. The circuitry 206 includes integrated subcomponents such as a tokenizer 208, a sub-token decomposition module 210, an embedding generator 212, a concatenator 214, a normalizer 216, a positional embedding adder 218, a masking unit 220, a speech token predictor 222, and a neural audio codec 224. These modules operate sequentially to implement the full text-to-speech pipeline.

The tokenizer 208 is configured to receive the input text from the LLM and tokenize the input text into a sequence of phoneme-level tokens. Each phoneme-level token corresponds to a unit used for generating a phoneme-embedding vector and is not a speech token. For example, an input word may be represented by multiple phoneme-level tokens that are directed to the appropriate FIFO queue within the queues 204. The tokenizer 208 may be implemented using a grapheme-to-phoneme (G2P) process, rule-based lexical analyzer, sub-word tokenizer such as WordPiece or BPE, or neural tokenizer using transformer encoders.

The sub-token decomposition module 210 is configured to assign the sequence of phoneme-level tokens to adaptive text chunks based on detected sentence boundaries and to alternately enqueue the adaptive text chunks in the first FIFO queue and the second FIFO queue. Dynamic updates to an adaptive chunk size are performed according to the detected sentence boundaries to maintain streaming performance. This sub-tokenization enables finer phonetic granularity. For instance, the speech token corresponding to the word "adaptation" may be decomposed into sub-tokens such as "ada," "pta," and "tion" using the G2P rule-based phoneme alignment or learned BPE schemes. The decomposition module 210 may be realized through finite state machines or neural alignment models trained on speech corpora.

The sub-tokens are then processed by an embedding mapper 212. The embedding generator 212 is configured to map each phoneme-level token to a phoneme-embedding vector. In an exemplary implementation, the embedding vector represents a high-dimensional numerical encoding of the phoneme-level token. In certain embodiments, each phoneme-embedding vector is padded with a padding vector corresponding to a predetermined pad token that lacks phonetic information. The padding is performed such that the length of a resulting padded phoneme-embedding sequence is equal to a number of the phoneme-level tokens.

The embedding output is then transmitted to a concatenator 214. The concatenator 214 is configured to combine the padded phoneme-embedding sequence with a latent acoustic feature vector derived from a previously generated speech token, thereby forming a concatenated or combined feature vector. For instance, if the previous speech token corresponds to the phoneme "pro" from "productivity," its latent acoustic feature vector is combined with the embedding vector for the next sub-token "duct," generating a feature vector that retains both current textual embedding information and the preceding temporal acoustic context. In other words, a latent acoustic-feature vector associated with a most recent speech token is concatenated with a phoneme-embedding vector for a next phoneme-level token, generating a feature vector that retains both current phoneme-level information and preceding temporal acoustic context.

The combined feature vector is then processed by a normalizer 216. The normalizer 216 performs L2-normalization on the combined feature vector, resulting in an L2-normalized vector whose magnitude is standardized. This normalization step improves numerical stability and mitigates the risk of gradient explosion or vanishing during the decoder-only transformer's autoregressive prediction stage.

Following normalization, the L2-normalized vector is forwarded to a positional embedding adder 218. The positional embedding adder 218 incorporates a learnable positional embedding vector into the L2-normalized combined feature vector. The positional embedding vector conveys information regarding the position of the combined-feature vector within a sequence of such vectors, thereby enabling the decoder-only transformer 202 to distinguish between identical phoneme-level contexts occurring at different positions in the text or the sequence. For example, the occurrence of the word "system" at the beginning of a sentence is distinguished from its occurrence at the end, thereby preserving syntactic and prosodic characteristics in the generated speech.

The output from the positional embedding adder 218 is supplied to a masking unit 220. The masking unit 220 applies a causal-attention mask so that each speech token attends only to preceding speech tokens generated by the decoder-only transformer 202, thereby maintaining the autoregressive property. This ensures that during prediction of a given speech token, no information from future speech tokens is accessed, which is critical for real-time streaming applications.

The position-embedded feature vector is provided to a speech token predictor 222, which operates in coordination with the decoder-only transformer 202 to autoregressively predict subsequent speech tokens based on the received combined, normalized, position embedded, and masked feature vectors. The decoder-only transformer 202 performs multi-head attention computations, with each head attending selectively to the relevant past tokens or the preceding speech tokens, thereby capturing both short-term and long-term dependencies in the speech synthesis process.

The predicted speech tokens are then processed by a neural audio codec 224. The neural audio codec 224 is configured to generate the final speech waveform from the predicted speech tokens. In some embodiments, the neural audio codec 224 implements a single-layer residual vector quantization (RVQ) scheme to produce high-fidelity speech signals.

Figure 2B:
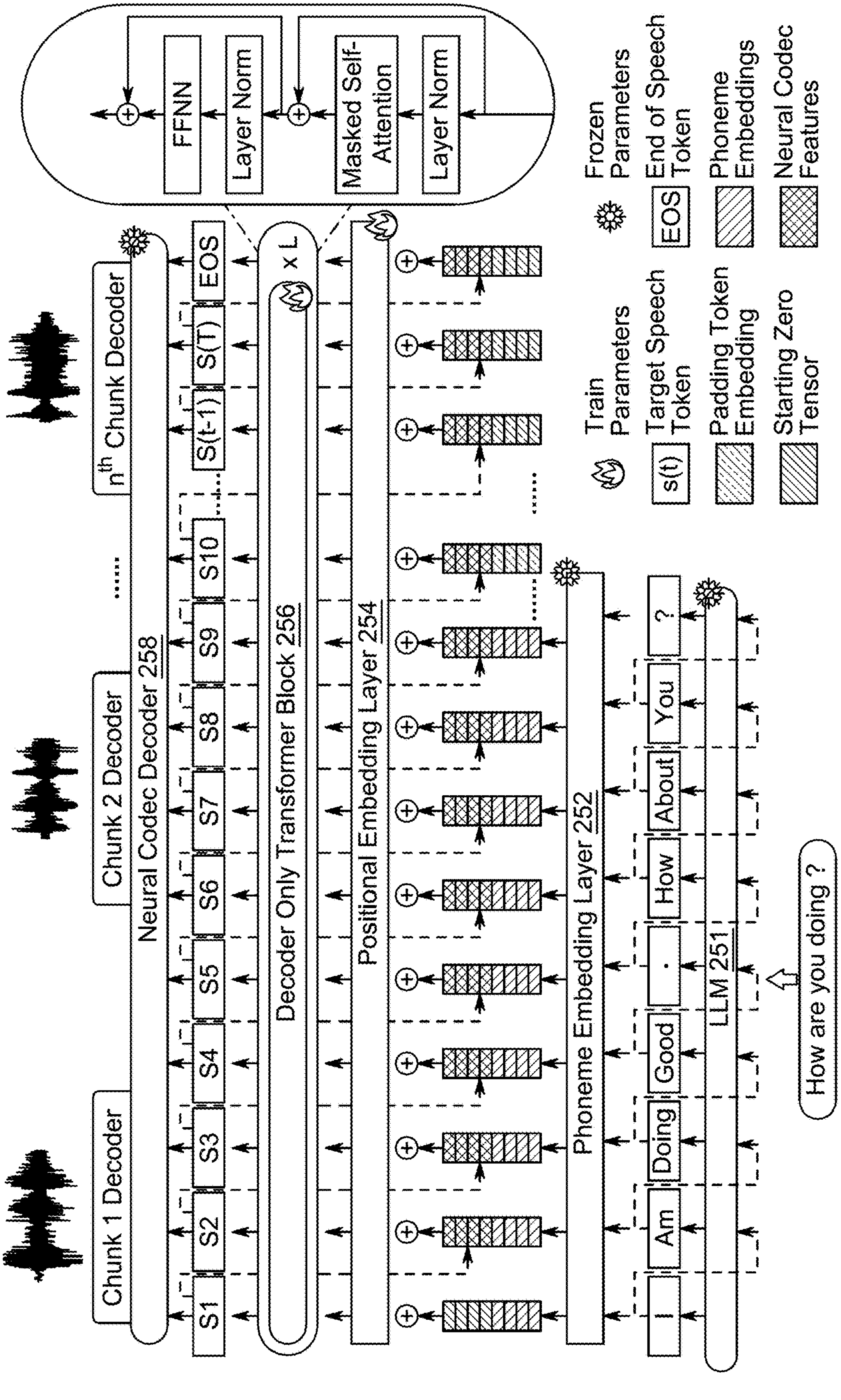
FIG. 2B is a flow diagram depicting the inference process for streaming speech synthesis using the transformer decoder and WavTokenizer decoder according to some embodiments of the present disclosure.

FIG. 2B illustrates an autoregressive text-to-speech (TTS) system 200 configured to receive an input text from a large language model (LLM) 251 and convert the input text into a sequence of speech tokens for streaming audio synthesis. The TTS system 200 includes a phoneme-embedding layer 252, a positional-embedding layer 254, a decoder-only transformer block 256, and a neural audio codec 258 implementing residual vector quantization (RVQ). The system components operate in a token-by-token autoregressive manner to facilitate low-latency, high-fidelity speech generation.

The phoneme embedding layer 252 is configured to receive the input text generated by a large language model (LLM) 251, such as the phrase "How are you doing?". The input text is tokenized by a tokenizer to yield a sequence of byte-level phoneme sub-tokens or speech tokens for streaming audio synthesis. In one example, the tokenizer is a ByT5-based Grapheme-to-Phoneme (G2P) process or a neural tokenizer. Each word in the input sentence is decomposed into a sequence of sub-tokens. For example, the word "doing" is decomposed into sub-tokens such as "d", "o", "i", "n", and "g". Each sub-token is mapped to a phoneme embedding vector of dimensionality 256 using a ByT5 embedding table, where each embedding captures contextual and phonetic characteristics across over 100 supported languages. The ByT5 embedding table refers to the input embedding layer used in the ByT5 (Byte-to-Text Transfer Transformer) model, which is a variant of the T5 (Text-to-Text Transfer Transformer) architecture developed by Google Research. It is designed to operate directly at the byte level.

The ByT5 tokenizer is implemented as a model-based embedding module, operable either as a software library or as firmware integrated within a system-on-chip. If the total number of phoneme embeddings is less than the number of speech tokens T to be generated, padding token embeddings are appended to align the sequence length to T. Let $\tilde{t}_1, \tilde{t}_2, \ldots, \tilde{t}_N$ denote the sequence of words produced by the LLM 251. Each word $\tilde{t}_i$ is decomposed into byte-level sub-tokens using the ByT5 tokenizer, i.e., $$\tilde{t}_i \rightarrow [\beta_1^i, \beta_2^i, \ldots, \beta_{n_i}^i],$$

where $n_i$ is the number of sub-tokens for token $\tilde{t}_i$. Let M be the total number of sub-tokens from all text tokens. Each sub-token $$\beta_j^i$$

is then mapped to an embedding vector as $$b_j^i = \text{Embed}_{ByT5}(\beta_j^i),$$

where $$b_j^i$$

$\in \mathbb{R}^{256}$.

The ground-truth speech is tokenized into a sequence of T discrete speech tokens using WavTokenizer, where typically T>M. To align the length mismatch we pad the sub-token sequence to length T. Formally, the padded text embedding sequence $\{b_1, b_2, \ldots, b_T\}$ is defined as:

$$b_t = \begin{cases} \text{Embed}_{ByT5}(\beta_t), & \text{if } 1 \le t \le M, \\ b_{PAD}, & \text{if } M < t \le T, \end{cases}$$

where $\beta_t$ is the t-th sub-token and $b_{PAD} \in \mathbb{R}^{256}$ is the embedding for the <PAD> token (obtained from the ByT5 embedding layer). Although $b_{PAD}$ does not encode phonetic information, the transformer's self-attention mechanism will use context from the previous inputs to refine its representation.

At each time step t(t=1, . . . , T), the input vector is constructed by concatenating the phoneme embedding $b_t \in \mathbb{R}^{256}$ with the latent acoustic feature vector $f_{t-1} \in \mathbb{R}^{512}$ from the previous speech token $S_{t-1}$, forming $x_t=[b_t; f_{t-1}] \in \mathbb{R}^{768}$. This vector is L2-normalized, and a learnable positional embedding $r_t \in \mathbb{R}^{768}$ is added, yielding $z_t=x_t+r_t$. The sequence $\{z_1, z_2, \ldots, z_T\}$ is then fed into the decoder-only transformer block 256.

The decoder-only transformer block 256 is composed of L=4 stacked transformer layers, each including a masked self-attention unit, a feedforward neural network (FFNN), and layer normalization operations. Each transformer layer performs multi-head self-attention using a causal mask to enforce autoregressive behavior, and nonlinear activation using feedforward networks. The decoder-only transformer block 256 may be implemented in hardware using inference accelerators or in software deployed on general-purpose processors. The decoder-only transformer is configured to model the conditional probability distribution probability $p(S_t|S_1, S_2, \ldots, S_{t-1}, \{z_1, z_2, \ldots, z_T\}, \theta)$, for each t=1, . . . , T, where z is the sequence of embedding vectors and θ represents the trainable parameters. The transformer predicts the next speech token St using only previous tokens and their contextual embeddings.

The training of the LLMVoX model is conducted by minimizing a cross-entropy loss function computed over a ground-truth speech token sequence {$S_1$, $S_2$, . . . , S_T}, where T denotes the total number of target speech tokens. The loss function L is formally defined as:

$$\mathcal{L} = -\sum_{t=1}^{T} \log p(S_t \mid S_{<t}, z, \theta)$$

In this formulation, $S_t$ denotes the t-th speech token in the output sequence, S_{<t} denotes the sequence of all preceding speech tokens, z denotes the latent input representation derived from the large language model (LLM) output or context vector, and θ represents the trainable parameters of the speech decoder network. The model is trained to maximize the conditional probability of the correct token St, given the preceding tokens, the latent representation, and the network parameters.

To enforce the autoregressive generation property of the decoder, a causal attention mask is applied within the Transformer-based decoder architecture. The causal mask ensures that, at each decoding timestep t, the model attends only to tokens $S_1$ through $S_{t-1}$, thereby preventing information leakage from future tokens.

The training procedure involves backpropagation through the decoder layers with respect to the loss L, enabling the optimization of parameters θ via stochastic gradient descent or any of its variants. The autoregressive decoding and masking framework allows the model to generate fluent and temporally coherent speech representations in response to a given language model context.

Figure 3:
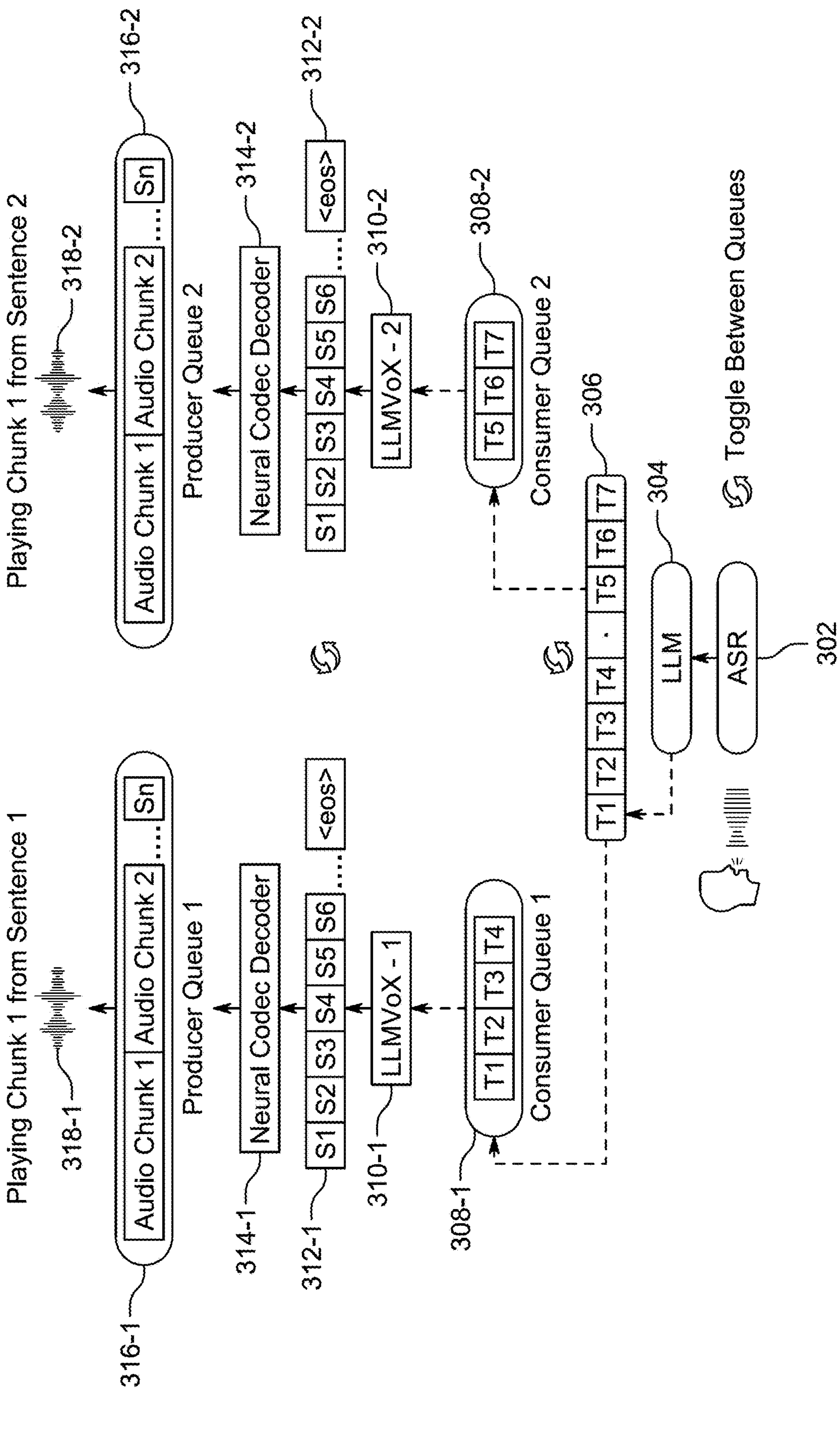
FIG. 3 is a schematic representation of a multi-queue streaming mechanism used for continuous speech output with alternating producer queues according to some embodiments of the present disclosure.

FIG. 3 illustrates a streaming inference pipeline for real-time speech dialogue generation using a dual-replica text-to-speech (TTS) processing architecture. The system comprises an automatic speech recognition (ASR) module 302 configured to receive user speech input and convert the audio signal into a corresponding transcribed text query $t_{query}$. The ASR module 302 may be implemented using Whisper or a comparable automatic speech recognition system to obtain $t_{query}$=ASR($x_{user}$). The ASR module 302 may include a microphone-coupled analog-to-digital converter, a feature extractor, and a neural speech-to-text engine comprising a convolutional encoder and a transformer-based decoder implemented as hardware circuitry, firmware, or a combination thereof, and configured to transform the acoustic waveform into linguistic tokens representing user intent.

The output of the ASR module 302 is provided to a large language model (LLM) 304, which generates a sequence of textual tokens $\{\tilde{t}_1, \tilde{t}_2, \ldots, \tilde{t}_N\}$=LLM($t_{query}$) based on the user query. The LLM 304 may be implemented as a transformer-based decoder-only architecture configured to condition on the transcribed user input and generate contextually relevant linguistic responses. The LLM 304 may include model weights stored in memory, positional encoding circuitry, and layer-normalized attention blocks for autoregressive token generation.

The sequence of tokens generated by the LLM 304 is depicted in block 306, where tokens are segmented based on sentence boundaries. A queue selection logic partitions the tokens alternately into a first consumer queue 308-1 and a second consumer queue 308-2. Each of the consumer queues 308-1 and 308-2 is implemented as a first-in-first-out (FIFO) data structure and is configured to operate in parallel for asynchronous TTS processing. For example, as shown, tokens T1 through T4 are allocated to the first consumer queue 308-1, while tokens T5 through T7 are allocated to the second consumer queue 308-2.

The first consumer queue 308-1 delivers its stored tokens to a first LLMVoX processing instance 310-1, whereas the second consumer queue 308-2 delivers its stored tokens to a second LLMVoX processing instance 310-2. Each LLMVoX instance 310-1, 310-2 functions as an autoregressive text-to-speech generation module configured to convert the input tokens into corresponding predicted speech tokens {S1, S2, . . . , Sn}.

The predicted speech tokens generated by the first LLMVoX instance 310-1 are enqueued into a first producer queue 312-1, while those from the second LLMVoX instance 310-2 are enqueued into a second producer queue 312-2. The producer queues 312-1 and 312-2 buffer the predicted speech tokens for downstream decoding.

The buffered speech tokens in the first producer queue 312-1 are processed by a first neural codec decoder 314-1, which converts the speech tokens into audio chunks, such as audio chunk 1, audio chunk 2, through audio chunk Sn, as shown in block 316-1. Similarly, the buffered speech tokens in the second producer queue 312-2 are processed by a second neural codec decoder 314-2 to generate corresponding audio chunks, as shown in block 316-2.

The audio chunks output from the first neural codec decoder 314-1 are streamed sequentially for playback in an audio output channel 318-1, representing the real-time playback of sentence 1. The audio chunks output from the second neural codec decoder 314-2 are similarly streamed in an audio output channel 318-2, representing the real-time playback of sentence 2.

The toggling mechanism between the consumer queues 308-1, 308-2 and the corresponding producer queues 312-1, 312-2 enables parallel and overlapping processing of consecutive sentences, thereby reducing end-to-end latency. For example, while sentence 1 audio is being played back from audio output channel 318-1, sentence 2 tokens are simultaneously being processed by the second LLMVoX instance 310-2, decoded by the neural codec decoder 314-2, and prepared for playback in audio output channel 318-2.

An adaptive streaming inference algorithm is employed, as shown below:

Algorithm 1 Streaming Inference with Adaptive Chunk Size (Parallel Text Generation)

```
Require: Speech query x_user
Ensure: Real-time sppech x̂
    ASR-Text ← ASR (x_user)
    LLM-Text ← LLM (ASR-Text) // Generate text token
    in parallel
    Enqueue generated text tokens into FIFO queue Q_0
    Split Q_0 into FIFO queues Q_1 and Q_2 (by sentence
    boundaries)
    for all i ∈ {1, 2} in parallel do
    {S_1, . . . , S_M} ← LLMVoX_i (Q_i) // Generate
    speech tokens
    chunk_size ← n, startIdx ← 1
    while starIdx ≤ M and speed ongoing do
    endIdx ← min(startIdx + chunk_size −
    1, M)
    Decode {S_startIdx, ... , S_endIdx} → x̂_i^(m); En −
    queue into P_i
    startIdx ← endIdx + 1, chunk_size ← 2.
    chunk_size
    end while
    end for
    Stream speech: Dequeue and steam chunks from P_1
    and P_2 concurrently until complete.
```

The system described in conjunction with FIG. 1 through FIG. 3 is evaluated by performing a series of experiments. The training dataset used for developing the streaming text-to-speech (TTS) system includes the VoiceAssistant400K dataset from the Mini-Omni series.

This dataset comprises over 400,000 GPT-4-generated question-answer pairs accompanied by synthesized speech, curated specifically for speech assistant fine-tuning. For training purposes, only the answer text and its corresponding synthetic speech are utilized, resulting in a corpus comprising approximately 2,200 hours of single-speaker English speech data.

For training the Arabic TTS model, a total of 450,000 text entries of variable lengths were collected from diverse Hugging Face corpora. These entries were subjected to a data cleaning process, followed by synthetic speech generation using XTTS at a low-temperature setting. This yielded approximately 1,500 hours of single-speaker Arabic speech data.

The streaming TTS model employed in the training pipeline is a four-layer, decoder-only transformer architecture. Each transformer block is configured with an embedding dimension $n_{em\beta}d$ equal to 768 and comprises $n_{hea}d$ equal to 8 attention heads. The model is trained with a microbatch size of 4 and a gradient_accumulation_steps parameter set to 8. A context block size of 8192 tokens is used to capture long-range dependencies during sequence modeling.

The optimization process is conducted using the AdamW optimizer, initialized with a learning rate $\ell_r = 3\times10^{-4}$ and a weight decay of 0.1. A warmup schedule is adopted for the first 50,000 training steps, after which the learning rate is decayed linearly to $3\times10^{-6}$ over the course of one million training steps. To ensure numerical stability, gradient clipping is applied with a maximum norm of 1.0.

Model training is performed over a span of approximately three days using four A100 GPUs, with all computations executed in bfloat16 floating-point precision to optimize training throughput. Flash-attention is employed to improve attention computation efficiency during training, and a key-value (KV) cache is utilized during inference to accelerate autoregressive decoding.

The training process is conducted independently for each language model. The English model is trained on the 2,200-hour dataset derived from the VoiceAssistant400K corpus, whereas the Arabic model is trained on the 1,500-hour dataset generated using XTTS. The training methodology is designed to ensure high-fidelity, low-latency streaming synthesis across diverse linguistic domains.

Figure 4:
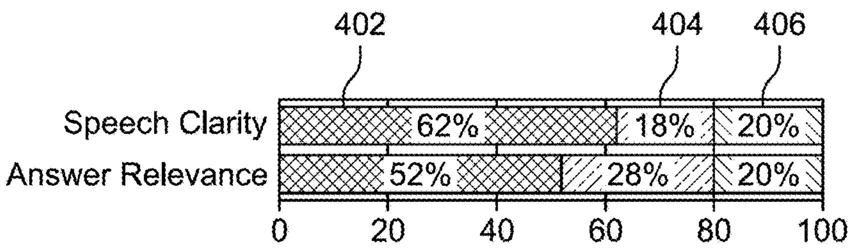
FIG. 4 is a bar chart comparing the human-evaluated answer relevance and speech quality between the disclosed system and a baseline Freeze-Omni system according to some embodiments of the present disclosure.

FIG. 4 illustrates a comparative human evaluation outcome assessing the effectiveness of the speech generation framework integrating LLMVoX. The comparison is established between LLMVoX and Freeze-Omni based on two qualitative metrics. Top row indicates the speech clarity, and a lower row indicates the answer relevance. The bar plot for speech clarity indicates that LLMVoX wins, denoted by 402-1, 62% of the evaluations, while 18% of the comparisons resulted in ties, denoted by 404-1, and 20% favored Freeze-Omni, denoted by 406-1. Similarly, for answer relevance, LLMVoX achieved a 52% win rate, denoted by 402-2, Freeze-Omni secured 20%, denoted by 406-2, and the remaining 28%, denoted by 404, were rated as ties.

These human evaluation metrics are derived through pairwise comparison judgments in which system responses are scored by GPT-4o according to predefined criteria of fluency, informativeness, and coherence, with scores normalized to a scale of 1 to 10. The LLMVoX system exhibited superior perceptual quality, particularly in speech clarity, as evident from the user preference data. The results substantiate the enhanced naturalness and intelligibility of the audio outputs generated by the dual-replica text-to-speech architecture of LLMVoX as compared to frozen LLM-based systems such as Freeze-Omni.

Figure 5:
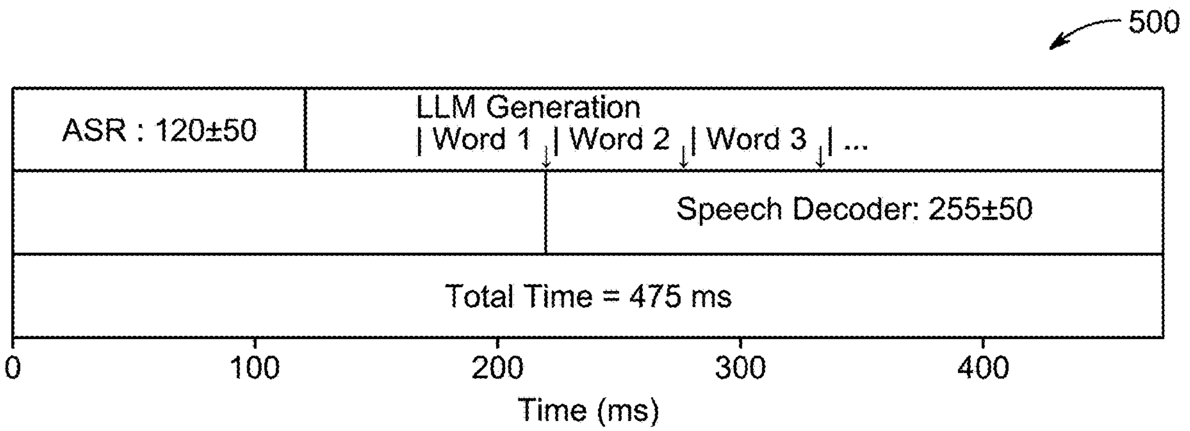
FIG. 5 is a timing chart illustrating average end-to-end latency breakdown across different components of the streaming pipeline at a chunk size of 40 according to some embodiments of the present disclosure.

FIG. 5 illustrates the timing breakdown 500 of the end-to-end latency achieved by the proposed streaming text-to-speech system using LLMVoX at a chunk size of 40 tokens for a single speech query. The total response latency is measured at approximately 475 milliseconds, encompassing multiple processing stages. The automatic speech recognition (ASR) stage consumes 120 milliseconds on average, with a deviation of 50 milliseconds. This is denoted as ASR: 120±50 in the figure. The ASR module operates by transcribing the user's speech input into corresponding textual content, and is implemented using Whisper models, as disclosed.

Following ASR, the large language model (LLM) generation module is responsible for generating a sequence of textual tokens, including Word 1, Word 2, Word 3, and subsequent terms. These tokens are processed using a streaming language generation architecture as detailed in the dual-queue setup of FIG. 3. The LLM module utilizes a decoder-only transformer with 4 layers, embedding dimension of 768, and 8 attention heads. The generated tokens are then forwarded for speech synthesis.

The speech decoder module reconstructs speech audio from text tokens using an autoregressive speech generation model within each LLMVoX replica. This stage is represented as Speech Decoder: 255±50 and constitutes the final step in the latency path. The decoder leverages residual vector quantization (RVQ) for generating high-fidelity speech tokens, which are converted to waveform audio by a neural codec decoder.

TABLE 1

Performance comparison of different frameworks with the framework of the disclosure

| Model | Base LLM | GPT-4o Score (↑) Avg. General QA | Knowledge | Avg | UTMOS (↑) (1-5) | WER (↓) (%) | Latency (↓) (ms) |
|---|---|---|---|---|---|---|---|
| Whisper + LLM + XTTS | LLaMA 3.1 8B | 6.70 | 7.70 | 7.20 | 4.23 | 1.70 | 4200 |
| SpeechGPT | LLaMA 2 13B | 1.40 | 2.20 | 1.80 | 3.86 | 66.57 | 4000 |
| Mini-Omni | Qwen2 0.5B | 2.7 | 2.4 | 2.55 | 3.24 | 26.12 | 350 |
| Llama-Omni | LLaMA 3.1 8B | 3.44 | 3.84 | 3.64 | 3.32 | 9.18 | 220 |
| Moshi | Helium 7B | 2.71 | 3.91 | 3.31 | 3.92 | 7.97 | 320 |
| GLM-4-Voice | GLM-4 9B | 5.24 | 5.67 | 5.30 | 3.97 | 6.40 | 2500 |
| Freeze-Omni | Qwen2 7B | 3.48 | 4.98 | 4.23 | 4.38 | 14.05 | 340 |
| MiniCPM-o 2.6 | Qwen2.5 7B | 5.46 | 6.21 | 5.84 | 3.87 | 10.60 | 1200 |
| Whisper + LLM + LLMVoX (disclosure) | LLaMA 3.1 8B | 6.14 | 7.62 | 6.88 | 4.05 | 3.70 | 475 |

Overall, the system renders an efficient processing pipeline with a cumulative latency of 475 milliseconds, making it suitable for real-time dialogue generation applications. The latency includes both computational processing time and decoding time for the initial output segment.

This performance is significantly superior when compared to cascaded pipelines like Whisper+LLM+XTTS, which have latencies as high as 4200 milliseconds, as disclosed in Table 1 of the specification. The timing values presented in FIG. 5 thus validate the real-time capabilities of LLMVoX by balancing low latency with acceptable speech quality, measured through UTMOS and word error rate (WER) metrics.

Figure 6A:
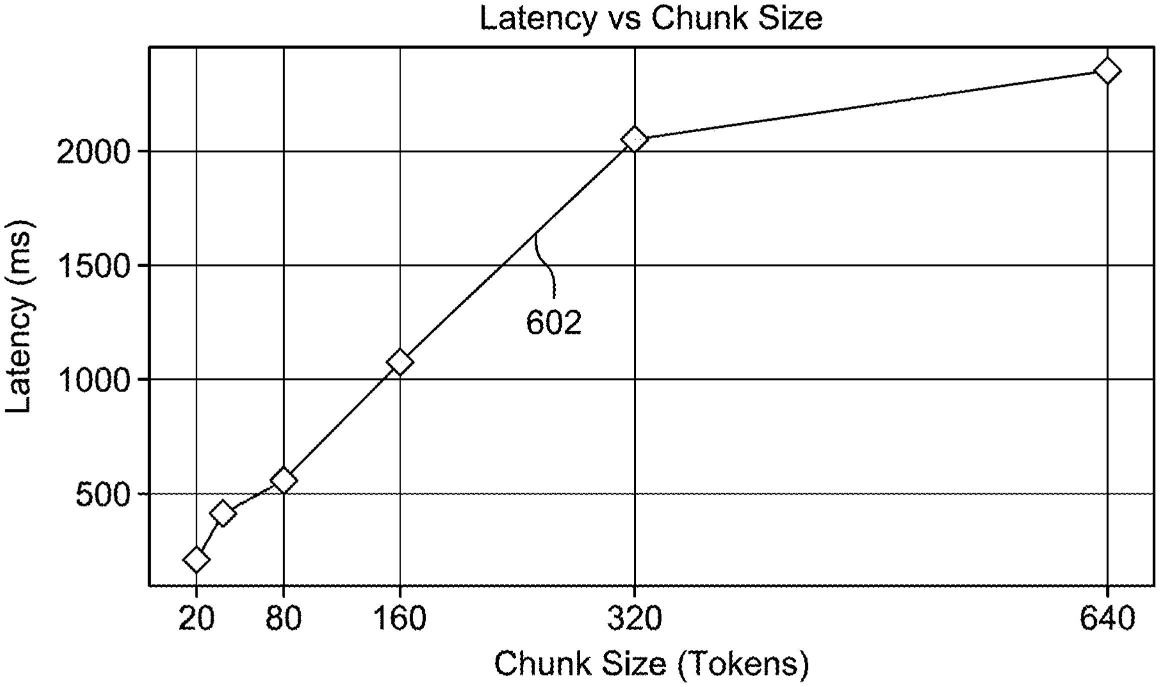
FIG. 6A is a graph illustrating the answer relevance score curve comparing different streaming TTS models according to some embodiments of the present disclosure.

FIG. 6A illustrates a performance evaluation graph depicting latency versus chunk size, where the horizontal axis represents chunk size measured in tokens and the vertical axis indicates latency measured in milliseconds. A latency performance curve 602 is plotted to represent the temporal delay incurred by the system for varying chunk sizes during end-to-end speech generation. The latency curve 602 demonstrates an increasing trend as the chunk size grows from 20 tokens to 640 tokens. For instance, the latency is approximately 475 milliseconds at a chunk size of 20 tokens and exceeds 2000 milliseconds at a chunk size of 320 tokens. This latency pattern underscores the trade-off between real-time responsiveness and processing efficiency in speech generation workflows.

Figure 6B:
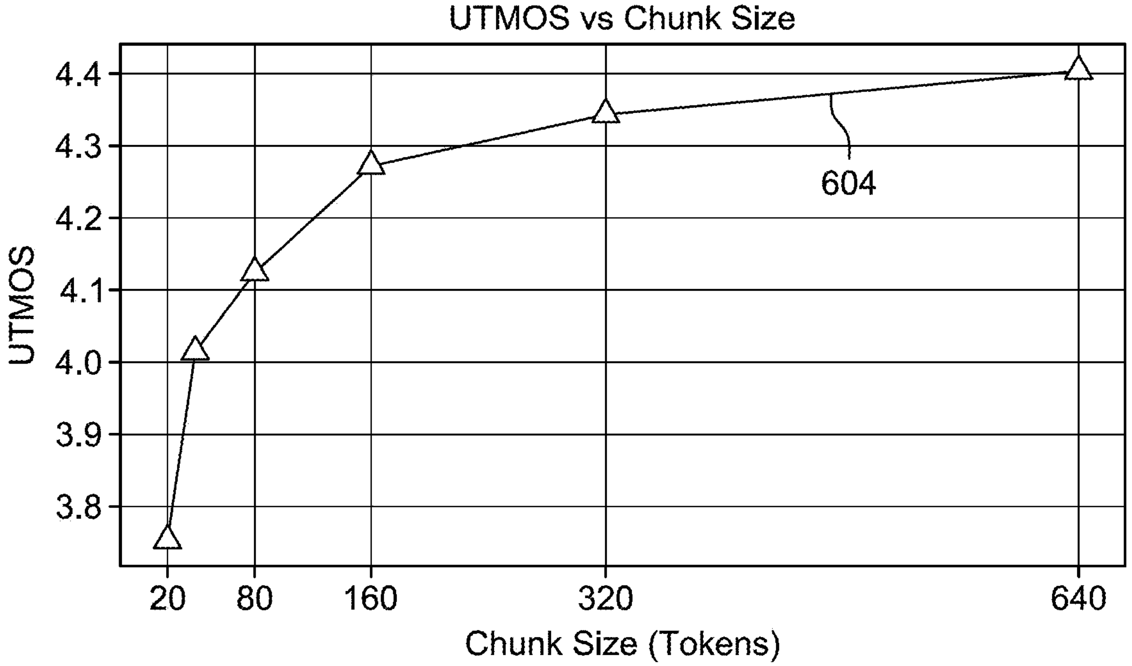
FIG. 6B is a graph illustrating the speech quality score curve comparing different streaming TTS models according to some embodiments of the present disclosure.

FIG. 6B depicts a graph of UTMOS versus chunk size, where the UTMOS (Universal Text-to-Speech Mean Opinion Score) reflects the naturalness of synthesized speech on a scale from 1 to 5. The horizontal axis corresponds to chunk size in tokens, while the vertical axis represents UTMOS scores. A UTMOS quality curve 604 is plotted to illustrate the impact of increasing chunk size on perceived speech quality. The UTMOS quality curve 604 curve 604 shows a positive trajectory, with UTMOS improving from below 3.8 at 20 tokens to over 4.4 at 640 tokens. The trend validates that larger chunk sizes enhance prosodic consistency and naturalness, resulting in more fluid and human-like speech output.

Figure 6C:
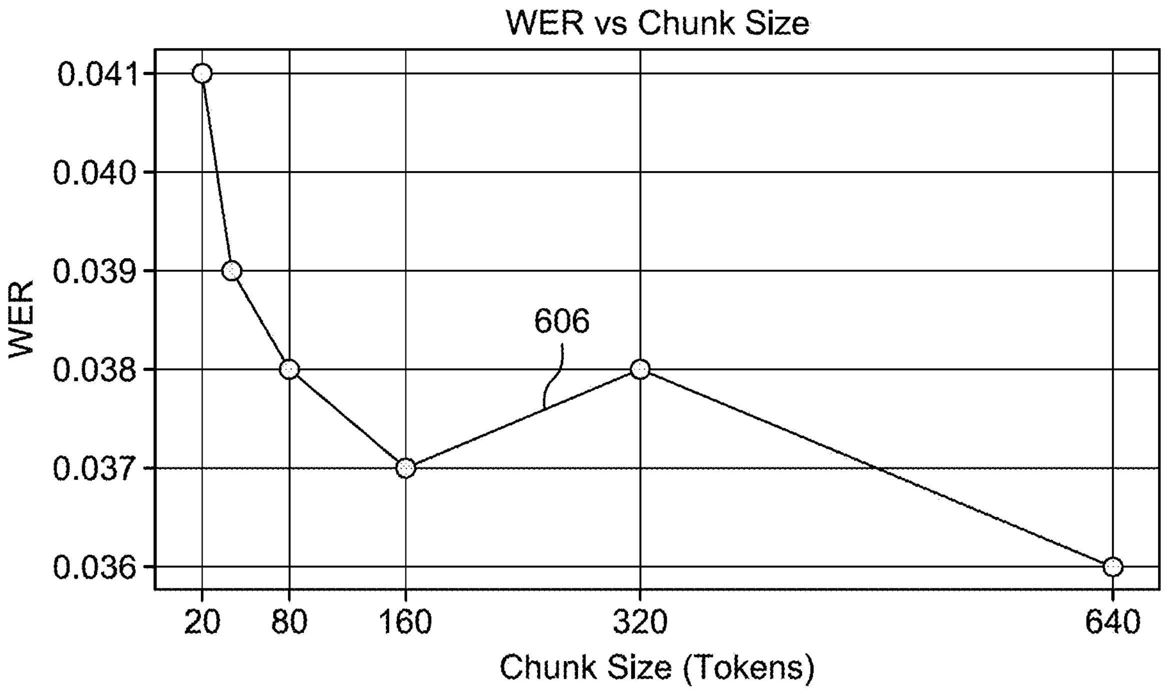
FIG. 6C is a graph illustrating the word error rate (WER) curve comparing different streaming TTS models according to some embodiments of the present disclosure.

FIG. 6C presents a graph of Word Error Rate (WER) versus chunk size, where WER is calculated as the ratio of incorrectly recognized words to the total words, based on a comparison between Whisper-transcribed audio outputs and the original LLM-generated reference text. The horizontal axis denotes chunk size in tokens, and the vertical axis indicates WER values. A WER accuracy curve 606 is plotted to show the alignment quality between synthesized speech and its transcribed text. The curve 606 begins at approximately 0.041 for a chunk size of 20 tokens and decreases to around 0.036 for 640 tokens, with slight fluctuations observed at intermediate sizes. This demonstrates that increasing chunk size contributes to improved speech-text alignment and reduced transcription errors.

Figure 6D:
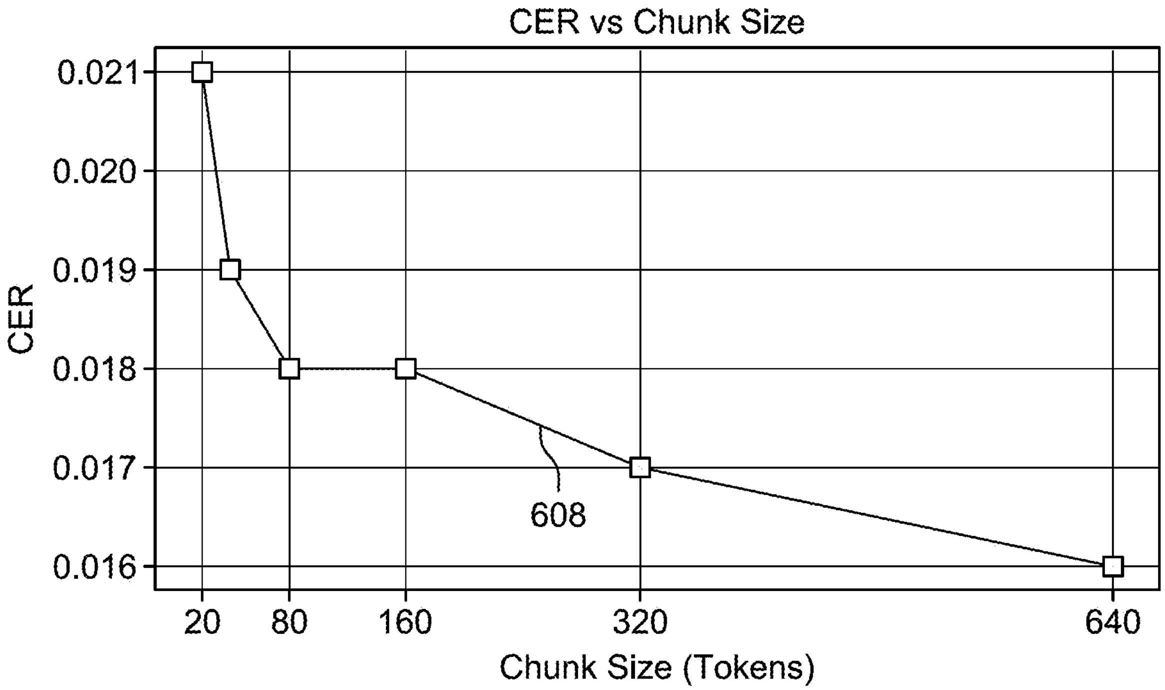
FIG. 6D is a graph illustrating the latency curve comparing different streaming TTS models according to some embodiments of the present disclosure.

FIG. 6D illustrates a graph of Character Error Rate (CER) versus chunk size, where CER measures phoneme-level mismatch by computing the character-wise Levenshtein distance between transcribed and generated sequences. The horizontal axis represents chunk size in tokens, and the vertical axis displays CER values. A CER alignment curve 608 is plotted, indicating a consistent reduction in character-level errors as the chunk size increases. The curve 608 drops from an initial value of approximately 0.021 at 20 tokens to around 0.016 at 640 tokens, demonstrating enhanced phonetic fidelity and pronunciation accuracy in the generated speech outputs with larger generation contexts.

Collectively, the FIG. 6A through FIG. 6D affirm that chunk size is a pivotal parameter affecting the performance of the LLMVoX system. Specifically, curve 602 illustrates the latency overhead associated with larger chunks, while curve 604 captures the associated gain in perceptual speech quality. Curve 606 and curve 608 provide quantitative evidence of improved transcription alignment and phoneme-level accuracy, thereby supporting the system's capability for real-time, high-quality, and semantically coherent speech generation with tunable latency and alignment performance.

Analysis represented by FIG. 6A through FIG. 6D is further discussed herein. Table 2 presents the latency analysis of LLMVoX when integrated with various large language models (LLMs) at a fixed chunk size of 40. The results indicate that latency increases with the size of the LLM used. Specifically, smaller models, such as Qwen 2.5 (0.5 B) and Llama 3.2 (3 B), achieve comparatively low latency values of approximately 0.33 to 0.36 seconds. In contrast, larger models, including Phi 4 (14 B) and Llama 3.3 (70 B), exhibit latency values exceeding 1 second. This trend demonstrates that while model size significantly affects inference latency, the underlying architectural design and implementation optimizations of the respective LLMs also play a substantial role in determining the end-to-end processing time.

TABLE 2

End-to-end latency(ASR included) of LLMVoX with various LLMs at chunk size of 40.

| LLM | Params | Latency (s) |
|---|---|---|
| Qwen 2.5 | 0.5 B | 0.33 |
| Lamma 3.2 | 3 B | 0.36 |
| Lamma 3.1 | 8 B | 0.47 |
| Phi 4 | 14 B | 0.95 |
| Mixtral Small | 24 B | 1.25 |
| Qwen 2.5 | 32 B | 1.40 |
| Lamma 3.3 | 70 B | 1.91 |

The performance of LLMVoX on a curated evaluation dataset in Arabic demonstrates the model's capability to generalize to non-English languages. On this dataset, LLMVoX achieves a character error rate (CER) of 8.2%, outperforming the majority of non-streaming TTS methods. The only exception is XTTS, which was used to synthesize the Arabic training data. This result highlights LLMVoX's strong adaptability to low-resource or cross-lingual scenarios, even in the absence of an explicit Grapheme-to-Phoneme (G2P) conversion mechanism or direct multilingual training. Table 3 shows comparative performance results of the present system and various models.

TABLE 3

Arabic TTS performance comparison. LLMVoX achieves competitive error rates in a streaming setup, operating at nearly 10 × faster speed compared to state-of-the-art XTTS.

| Model | Streaming | WER (↓) | CER (↓) |
|---|---|---|---|
| XTTS | No | 0.062 | 0.017 |
| ArTST | No | 0.264 | 0.125 |
| FastPitch Arabic Finetuned | No | 0.493 | 0.153 |
| Tacotron 2 Arabic Finetuned | No | 0.663 | 0.268 |
| Tacotron 2 Arabic Finetuned | No | 0.663 | 0.268 |
| Seamless-M4t-Large | No | 0.342 | 0.145 |
| LIMVoX (disclosure) | Yes | 0.234 | 0.082 |

The integration of LLMVoX into a multimodal pipeline for Visual Speech Question Answering (VSQA) further demonstrates the method's versatility. The VSQA setup includes Whisper-Small for automatic speech recognition (ASR), Qwen 2.5-VL-7B for vision-language modeling, and LLMVoX for real-time speech synthesis. Table 4 provides a comparative analysis of this pipeline against the omnimultimodal MiniCPM-o 2.6 model. Performance metrics include word error rate (WER), character error rate (CER), and GPT-4o-based evaluation scores. The integrated system comprising LLMVoX achieves a lower WER and a comparable GPT-4o score, indicating that LLMVoX is highly compatible with state-of-the-art visual-language models (VLMs) and can be reliably deployed for complex, multimodal, speech-based VQA tasks. Table 4 compares the present system with the omnimultimodal MiniCPM-o 2.6 model.

TABLE 4

VSQA performance on LLaVA-Bench (In-theWild) with Qwen 2.5 VL 7B as the backbone

| Model | WER | CER | GPT Score | Latency (s) |
| --- | --- | --- | --- | --- |
| MiniCPM-o 2.6 | 0.053 | 0.036 | 6.32 | 1.45 |
| LLMVoX (disclosure) | 0.042 | 0.022 | 6.41 | 1.05 |

The present disclosure thus introduces LLMVoX, an autoregressive, streaming text-to-speech (TTS) system that operates in an LLM-agnostic configuration through FIG. 2-FIG. 6D. LLMVoX is specifically designed to decouple the speech synthesis process from the underlying text generation mechanisms, thereby enabling seamless integration with a wide range of large language models (LLMs). The disclosed system utilizes a lightweight Transformer architecture in conjunction with a multi-queue streaming mechanism to achieve real-time audio rendering. This design ensures the delivery of high-quality and uninterrupted speech synthesis with minimal end-to-end latency, while fully preserving the reasoning output of the integrated LLM.

Comprehensive experiments conducted across English and Arabic language tasks demonstrate that LLMVoX either surpasses or performs on par with existing speech-enabled LLM solutions. These results confirm the system's effectiveness in multilingual scenarios and its applicability in real-world streaming environments. Overall, LLMVoX presents a scalable and efficient solution for deploying real-time, multimodal artificial intelligence systems requiring low-latency speech interaction.

Figure 7:
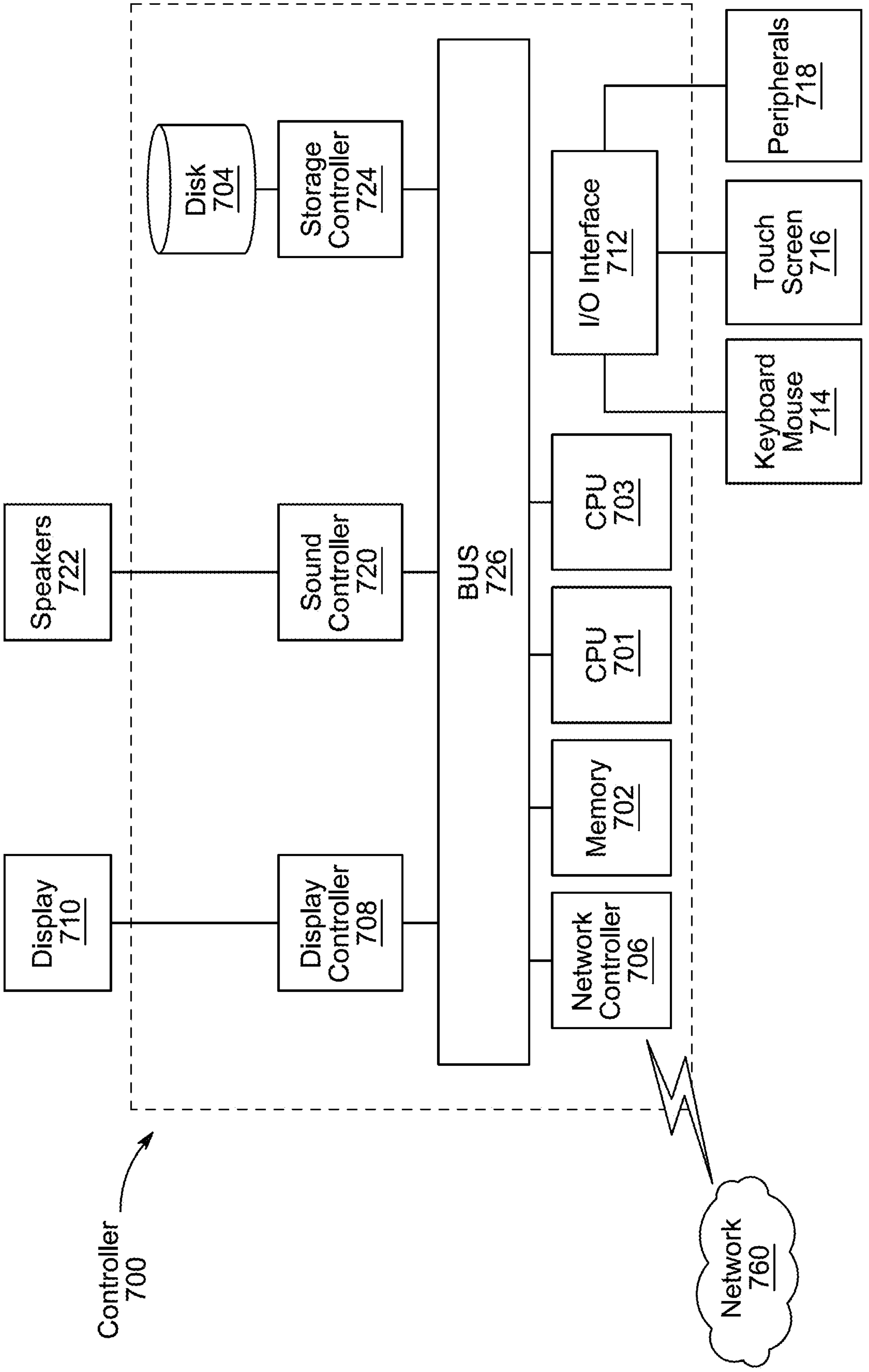
FIG. 7 is an illustration of a non-limiting example of details of computing hardware used in the computing system, according to certain embodiments.

Next, further details of the hardware description of the computing environment according to exemplary embodiments is described with reference to FIG. 7. In FIG. 7, a controller 700 is described is representative of the system 100 of FIG. 1 in which the controller is a computing device which includes a CPU 701 which performs the processes described above/below. The process data and instructions may be stored in memory 702. These processes and instructions may also be stored on a storage medium disk 704 such as a hard drive (HDD) or portable storage medium or may be stored remotely.

Further, the present disclosure is not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the present disclosure may be provided as a utility application, background daemon, or component of an operating system, or combination thereof, executing in conjunction with CPU 701, 703 and an operating system such as Microsoft Windows 7, Microsoft Windows 10, UNIX, LINUX, Apple MAC-OS and other systems known to those skilled in the art.

The hardware elements in order to achieve the computing device may be realized by various circuitry elements, known to those skilled in the art. For example, CPU 701 or CPU 703 may be a Xenon or Core processor from Intel of America or an Opteron processor from AMD of America, or may be other processor types that would be recognized by one of ordinary skill in the art. Alternatively, the CPU 701, 703 may be implemented on an FPGA, ASIC, PLD or using discrete logic circuits, as one of ordinary skill in the art would recognize. Further, CPU 701, 703 may be implemented as multiple processors cooperatively working in parallel to perform the instructions of the inventive processes described above.

The computing device in FIG. 7 also includes a network controller 706, such as an Intel Ethernet PRO network interface card from Intel Corporation of America, for interfacing with network 760. As can be appreciated, the network 760 can be a public network, such as the Internet, or a private network such as an LAN or WAN network, or any combination thereof and can also include PSTN or ISDN subnetworks. The network 760 can also be wired, such as an Ethernet network, or can be wireless such as a cellular network including EDGE, 3G, 4G, and 5G wireless cellular systems. The wireless network can also be WiFi, Bluetooth, or any other wireless form of communication that is known.

The computing device further includes a display controller 708, such as a NVIDIA GeForce GTX or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the computing device such as Sound Blaster X-Fi Titanium from Creative, to interface with speakers/microphone 722 thereby providing sounds and/or music.

The general purpose storage controller 724 connects the storage medium disk 704 with communication bus 726, which may be an ISA, EISA, VESA, PCI, or similar, for interconnecting all of the components of the computing device. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 8.

Figure 8:
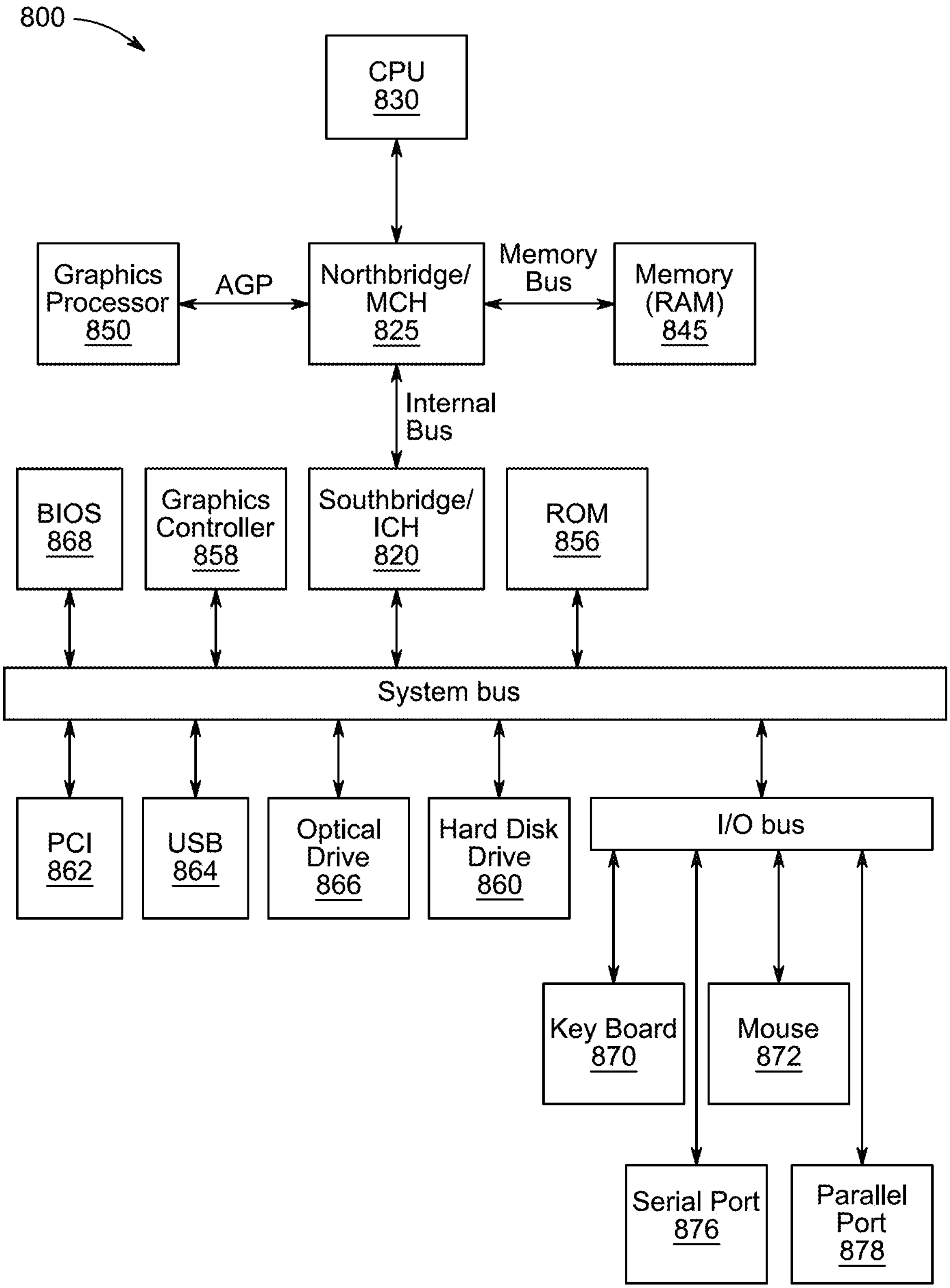
FIG. 8 is an exemplary schematic diagram of a data processing system used within the computing system, according to certain embodiments.

FIG. 8 shows a schematic diagram of a data processing system, according to certain embodiments, for performing the functions of the exemplary embodiments. The data processing system is an example of a computer in which code or instructions implementing the processes of the illustrative embodiments may be located.

In FIG. 8, data processing system 800 employs a hub architecture including a north bridge and memory controller hub (NB/MCH) 825 and a south bridge and input/output (I/O) controller hub (SB/ICH) 820. The central processing unit (CPU) 830 is connected to NB/MCH 825. The NB/MCH 825 also connects to the memory 845 via a memory bus, and connects to the graphics processor 850 via an accelerated graphics port (AGP). The NB/MCH 825 also connects to the SB/ICH 820 via an internal bus (e.g., a unified media interface or a direct media interface). The CPU Processing unit 830 may contain one or more processors and even may be implemented using one or more heterogeneous processor systems.

Figure 9:
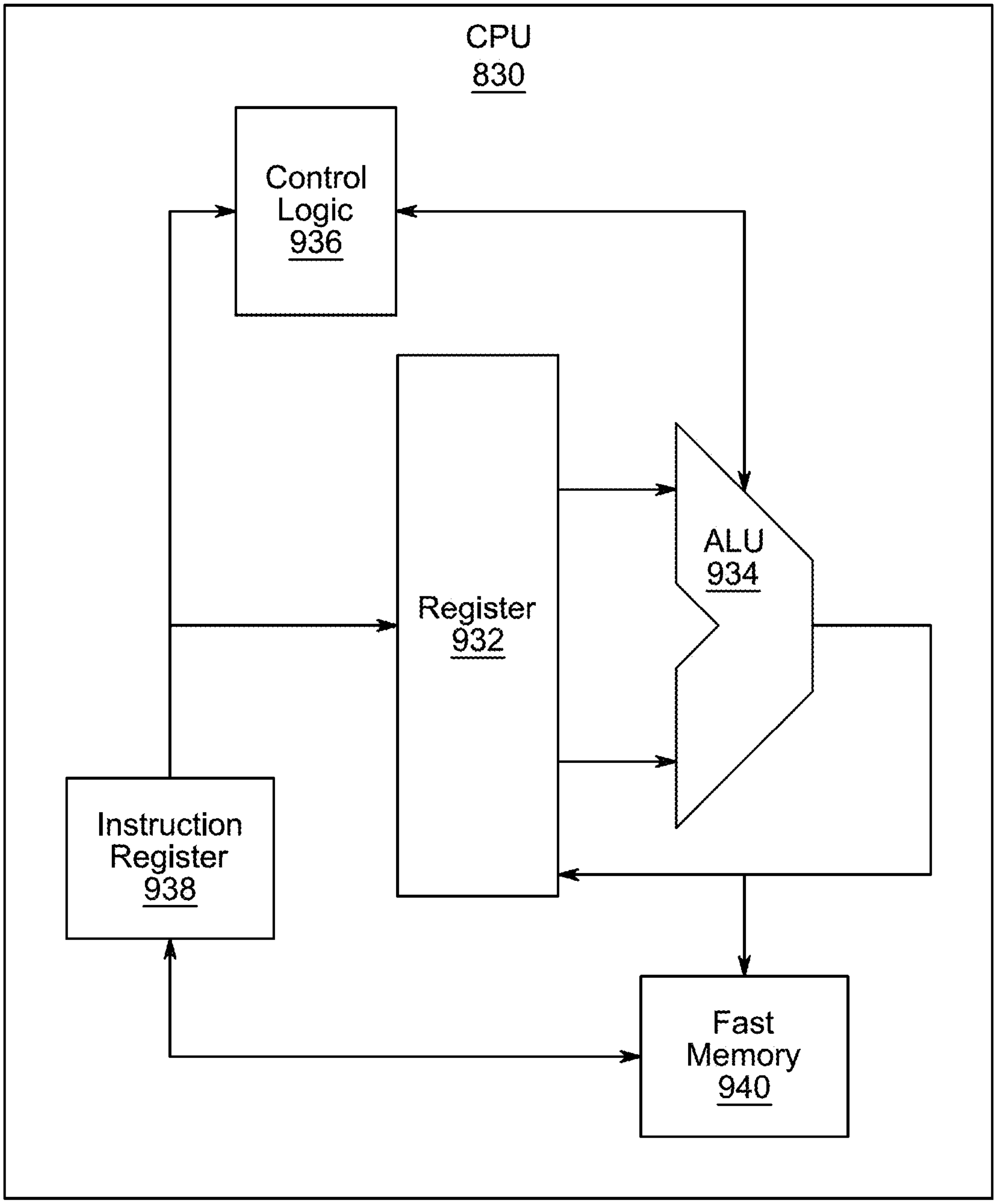
FIG. 9 is an exemplary schematic diagram of a processor used with the computing system, according to certain embodiments.

For example, FIG. 9 shows one implementation of CPU 830. In one implementation, the instruction register 938 retrieves instructions from the fast memory 940. At least part of these instructions are fetched from the instruction register 938 by the control logic 936 and interpreted according to the instruction set architecture of the CPU 830. Part of the instructions can also be directed to the register 932. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 934 that loads values from the register 932 and performs logical and mathematical operations on the loaded values according to the instructions. The results from these operations can be feedback into the register and/or stored in the fast memory 940. According to certain implementations, the instruction set architecture of the CPU 830 can use a reduced instruction set architecture, a complex instruction set architecture, a vector processor architecture, a very large instruction word architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 8, the data processing system 800 can include that the SB/ICH 820 is coupled through a system bus to an I/O Bus, a read only memory (ROM) 856, universal serial bus (USB) port 864, a flash binary input/output system (BIOS) 868, and a graphics controller 858. PCI/PCIe devices can also be coupled to SB/ICH 820 through a PCI bus 862. The PCI devices may include, for example, Ethernet adapters, add-in cards, and PC cards for notebook computers. The Hard disk drive 860 and CD-ROM 866 can use, for example, an integrated drive electronics (IDE) or serial advanced technology attachment (SATA) interface. In one implementation the I/O bus can include a super I/O (SIO) device.

Further, the hard disk drive (HDD) 860 and optical drive 866 can also be coupled to the SB/ICH 820 through a system bus. In one implementation, a keyboard 870, a mouse 872, a parallel port 878, and a serial port 876 can be connected to the system bus through the I/O bus. Other peripherals and devices that can be connected to the SB/ICH 820 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 10:
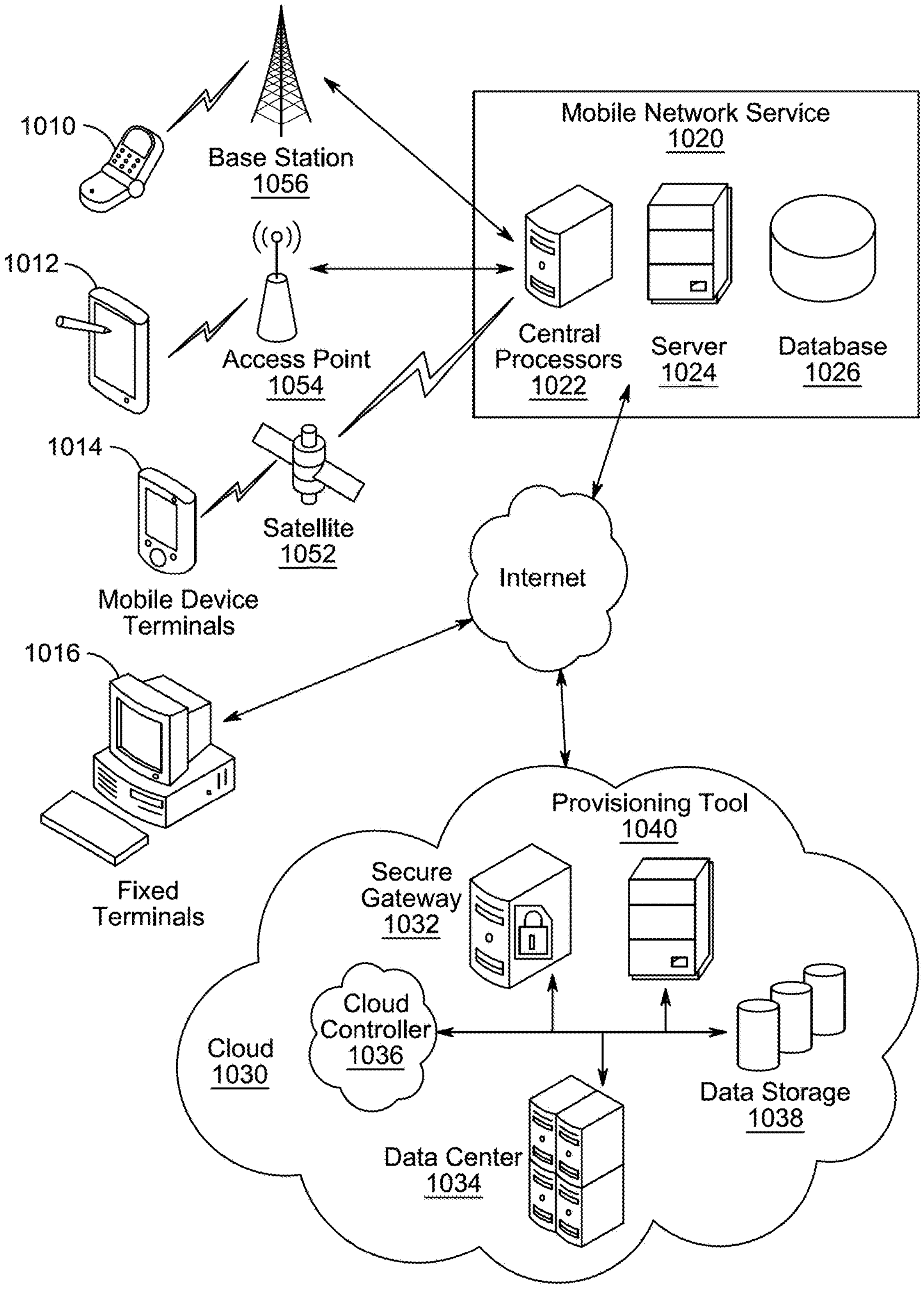
FIG. 10 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 10, in addition to various human interface and communication devices (e.g., display monitors, smart phones, tablets, personal digital assistants (PDAs)). More specifically, FIG. 10 illustrates client devices including a smart phone 1010, a tablet 1012, a mobile device terminal 1014 and fixed terminals 1016. These client devices may be commutatively coupled with a mobile network service 1020 via a base station 1056, an access point 1054, a satellite 1052 or via an internet connection. The mobile network service 1020 may comprise central processors 1022, a server 1024 and a database 1026. The fixed terminals 1016 and the mobile network service 1020 may be commutatively coupled via an internet connection to functions in cloud 1030 that may comprise a security gateway 1032, a data center 1034, a cloud controller 1036, a data storage 1038 and a provisioning tool 1040. The network may be a private network, such as the LAN or the WAN, or may be the public network, such as the Internet. Input to the system may be received via direct user input and received remotely either in real-time or as a batch process.

Additionally, some implementations may be performed on modules or hardware not identical to those described. Accordingly, other implementations are within the scope that may be disclosed.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

In the preceding description, specific details have been set forth, such as a particular geometry of a processing system and descriptions of various components and processes used therein. It should be understood, however, that techniques herein may be practiced in other embodiments that depart from these specific details, and that such details are for purposes of explanation and not limitation. Embodiments disclosed herein have been described with reference to the accompanying drawings. Similarly, for purposes of explanation, specific numbers, materials, and configurations have been set forth in order to provide a thorough understanding. Nevertheless, embodiments may be practiced without such specific details. Components having substantially the same functional constructions are denoted by like reference characters, and thus any redundant descriptions may be omitted.

Various techniques have been described as multiple discrete operations to assist in understanding the various embodiments. The order of description should not be construed as to imply that these operations are necessarily order dependent. Indeed, these operations need not be performed in the order of presentation. Operations described may be performed in a different order than the described embodiment. Various additional operations may be performed and/or described operations may be omitted in additional embodiments.

Those skilled in the art will also understand that there can be many variations made to the operations of the techniques explained above while still achieving the same objectives of the present disclosure. Such variations are intended to be covered by the scope of this disclosure. As such, the foregoing descriptions of embodiments of the invention are not intended to be limiting. Rather, any limitations to embodiments of the invention are presented in the following claims.

The invention claimed is:

1. A text-to-speech (TTS) method performed by a TTS system for converting an input text generated by a large language model (LLM) into an audio speech signal, the method comprising:

receiving the input text from the large language model (LLM);

tokenizing the input text into a sequence of phoneme-level tokens;

assigning, based on sentence boundaries detected within the input text, the sequence of phoneme-level tokens to a plurality of adaptive text chunks;

alternately enqueuing the plurality of adaptive text chunks in first and second first-in-first-out (FIFO) buffers included in the TTS system;

concurrently processing the plurality of adaptive text chunks in the first and second FIFO buffers, the concurrently processing including, for each adaptive text chunk in a respective one of the first and second FIFO buffers:

mapping each phoneme-level token in the adaptive text chunk to a phoneme embedding vector, concatenating each phoneme embedding vector with a latent acoustic feature vector derived from a previous speech token or initialized as a zero tensor to form a combined feature vector, adding a learnable positional embedding vector to each combined feature vector to form a sequence of position-embedded feature vectors, and feeding the sequence of position-embedded feature vectors to a decoder-only transformer in the TTS system to cause the decoder-only transformer to autoregressively predict subsequent speech tokens for the adaptive text chunk in a streaming manner; and decoding, by a neural audio codec in the TTS system, the predicted speech tokens generated in the streaming manner to generate a final speech waveform as the audio speech signal.

2. The text-to-speech method of claim 1, further comprising, during the concurrently processing:

padding the phoneme embedding vector with a padding vector corresponding to a predetermined pad token that lacks phonetic information such that a padded phoneme-embedding sequence has a uniform length equal to a number of the phoneme-level tokens, and concatenating the padded phoneme-embedding sequence with the latent acoustic feature vector.

3. The text-to-speech method of claim 1, further comprising applying a causal attention mask within the decoder-only transformer so that each speech token attends only to preceding speech tokens in a sequence of speech tokens predicted by the decoder-only transformer.

4. The text-to-speech method of claim 1, further comprising, during the concurrently processing, L2-normalizing the combined feature vector before adding the learnable positional-embedding vector.

5. The text-to-speech method of claim 1, further comprising updating an adaptive chunk size according to the sentence boundaries.

6. The text-to-speech method of claim 1, further comprising initializing the latent acoustic feature vector as a zero tensor before generating a first speech token.

7. The text-to-speech method of claim 1, further comprising updating the latent acoustic feature vector using an acoustic feature derived from a most recent speech token for use in a subsequent concatenating step.

8. The text-to-speech method of claim 1, wherein the neural audio codec that uses a single-layer residual vector quantization (RVQ) to generate the audio speech signal.

9. A text-to-speech system for converting an input text generated by a large language model (LLM) into an audio speech signal, the system comprising:

first and second first-in-first-out (FIFO) buffers;

a decoder-only transformer;

processing circuitry configured to:

receive the input text from the large language model (LLM), tokenize the input text into a sequence of phoneme-level tokens, assign, based on sentence boundaries detected within the input text, the sequence of phoneme-level tokens to a plurality of adaptive text chunks, alternately enqueue the plurality of adaptive text chunks in the first and second first-in-first-out (FIFO) buffers, concurrently process the plurality of adaptive text chunks in the first and second FIFO buffers, wherein the concurrently processing includes, for each adaptive text chunk in a respective one of the first and second FIFO buffers:

map each phoneme-level token in the adaptive text chunk to a phoneme embedding vector, concatenate each phoneme embedding vector with a latent acoustic feature vector derived from a previous speech token or initialized as a zero tensor to form a combined feature vector, add a learnable positional embedding vector to each combined feature vector to form a sequence of position-embedded feature vectors, and feed the sequence of position-embedded feature vectors to the decoder-only transformer to cause the decoder-only transformer to autoregressively predict subsequent speech tokens for the adaptive text chunk in a streaming manner; and a neural audio codec configured to decode the predicted speech tokens generated in the streaming manner to generate a final speech waveform as the audio speech signal.

10. The text-to-speech system of claim 9, wherein the processing circuitry is configured to, during the concurrently processing:

pad each phoneme embedding vector with a padding vector corresponding to a predetermined pad token that lacks phonetic information such that a padded phoneme-embedding sequence has a uniform length equal to a number of the phoneme-level tokens, and concatenate the padded phoneme-embedding sequence with the latent acoustic feature vector.

11. The text-to-speech system of claim 9, wherein the decoder-only transformer is configured to apply a causal attention mask so that each speech token attends only to preceding speech tokens generated by the decoder-only transformer.

12. The text-to-speech system of claim 9, wherein the processing circuitry is configured to, during the concurrently processing, L2-normalize each combined feature vector before adding the learnable positional embedding vector.

13. The text-to-speech system of claim 9, wherein the processing circuitry is further configured to update an adaptive chunk size according to the sentence boundaries.

14. The text-to-speech system of claim 9, wherein the processing circuitry is configured to:

initialize the latent acoustic feature vector as a zero tensor before generating a first speech token, and update the latent acoustic feature vector using an acoustic feature derived from a most recent speech token for use in a subsequent concatenating step.

* * * * *